A. BELER.
VALVE MECHANISM.
APPLICATION FILED APR. 6, 1916.

1,246,041.

Patented Nov. 13, 1917.
2 SHEETS—SHEET 2.

Witnesses

A. Beler
Inventor by
Attorneys

UNITED STATES PATENT OFFICE.

ADOLF BELER, OF PITTSBURGH, PENNSYLVANIA.

VALVE MECHANISM.

1,246,041.  Specification of Letters Patent.  Patented Nov. 13, 1917.

Application filed April 6, 1916. Serial No. 89,418.

*To all whom it may concern:*

Be it known that I, ADOLF BELER, a citizen of the United States, residing at Pittsburgh, in the county of Allegheny and State of Pennsylvania, have invented a new and useful Valve Mechanism, of which the following is a specification.

This invention relates to valve mechanism of that type under the control of a thermostat and which is provided for regulating the flow of gas to a hot water heater or the like, one of the objects of the invention being to provide a valve which will snap to open or to closed position, according to the action of its controlling thermostat, this quick movement of the valve causing an instantaneous shutting off or opening of the supply of gas.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred forms of the invention have been shown.

In said drawings:—

Figure 3:
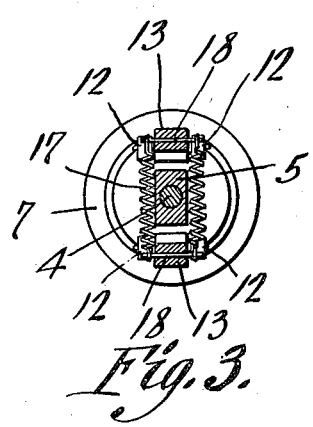
Fig. 3 is a section on line A—B, Fig. 2.

Referring to the figures by characters of reference 1 designates a gas supply pipe having a valve casing 2 within which is provided a valve seat 3. Slidably mounted within the casing is a stem 4 to which is secured a sleeve 5 constituting a bearing for one end of a coiled spring 6, this spring being mounted on a portion of the stem and bearing at its other end against the wall of the casing 2 so as to hold the stem normally pressed in one direction. The stem 4 is slidably mounted in a valve 7 and this valve is preferably provided with a central boss 8 engaged by a cap 9 which houses one end of the stem. Said end of the stem may be provided with a stop pin 11 extending therethrough and projecting therebeyond and which serves to limit the relative longitudinal movement of the stem 4 in one direction. The valve 7 has diametrically opposed ears 12 projecting therefrom and these ears are pivotally engaged by links 13. In the inner edge of each link, close to the free end thereof, is provided a notch 14 for the reception of one end of a link 15 the other end of which is seated in a notch 16 formed in the sleeve 5. The links 15 are diametrically opposed. A spring 17 is attached at its ends to the links 13 so as to draw them toward each other. If preferred, two of these springs may be employed as illustrated in Fig. 3, the said springs extending to opposite sides of the sleeve 5 and being attached to pins 18 extending transversely through the links 13.

The controlling thermostat may be of any construction desired. In the form illustrated, it comprises a tubular water conductor indicated at 19 and which has a high coefficient of expansion, there being a knife edge projection 20 carried by one end portion of this conductor and which engages one edge portion of an angular lever 21. A member 22 having a lower coefficient of expansion is extended adjacent the tubular member 19 and has a bearing projection 23 which engages the other edge of the lever 21 at a point out of alinement with the projection 20. Lever 21 projects along the member 19 and laps one end of an intermediate lever 24 which is fulcrumed as at 25 and which has a bearing screw 26 adjustable in one end thereof and adapted to engage one end of lever 21. From the other end of lever 24 extends a spring strip 27 slidably engaging a head 28 provided at the outer end of the stem 4.

Figure 1:
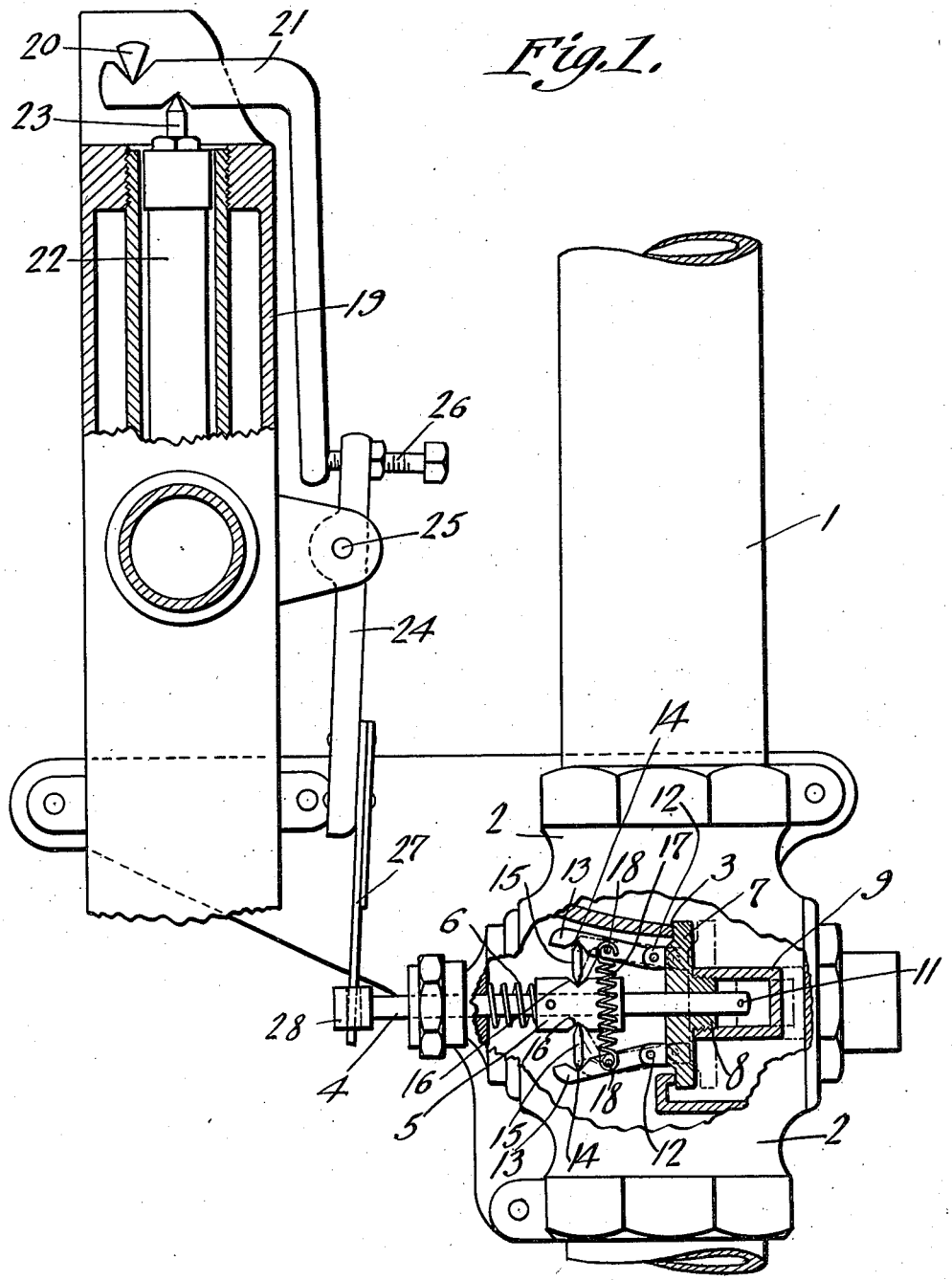
Figure 1 is a view partly in elevation and partly in section showing the valve and a portion of its controlling thermostat, the valve being shown, in full lines upon its seat and, in dotted lines, off of its seat.
Figure 2:
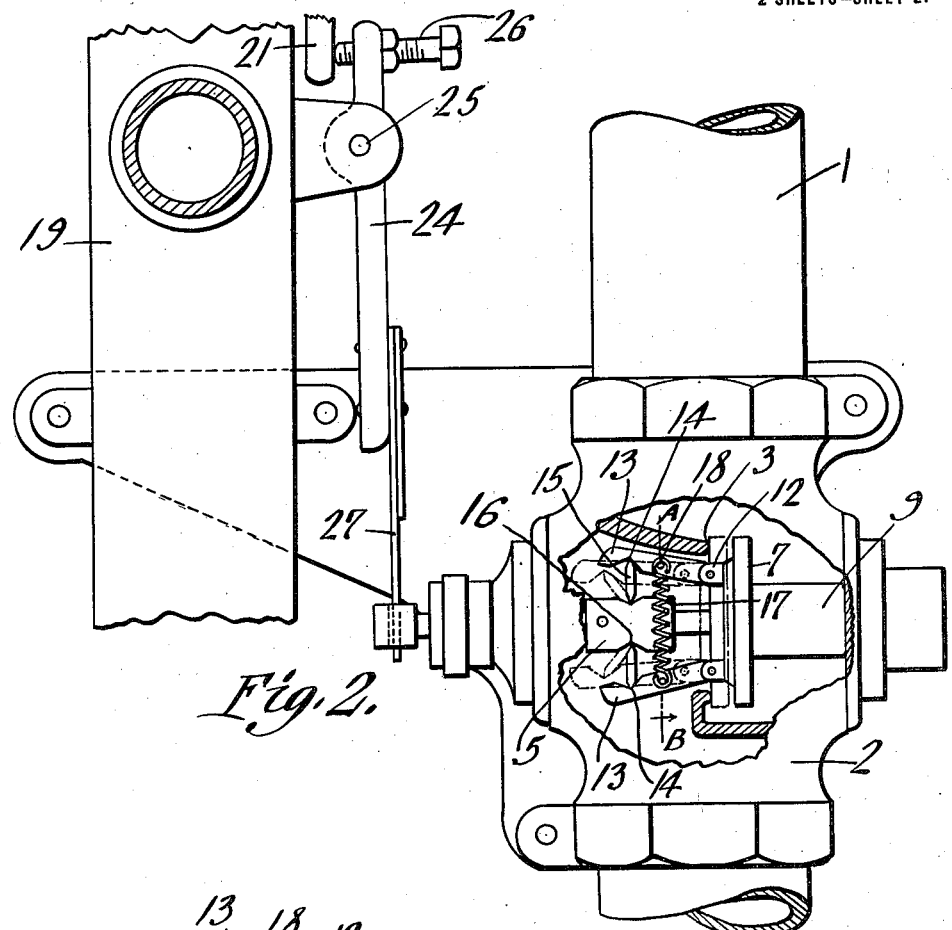
Fig. 2 is a view similar to Fig. 1 and showing, in full lines, the valve off of its seat and, in dotted lines the position of the valve when on its seat.

It will be obvious that when the member 19 is contracted, due to the low temperature of its liquid contents, the upper end of lever 21 will be thrust downwardly, the bearing member 23 acting as a fulcrum. Consequently the lower end of lever 21 will thrust outwardly against the screw 26 and cause the spring strip 27 to swing toward the member 19 and pull through head 28 upon the stem 4. Consequently the inner ends of the links 15 will be moved with the stem 4 and will be pulled past their dead centers with the result that spring 17, which is constantly under tension, will pull the pivoted links 13 toward each other. Links 13 and 15 will thus act as toggles and will thrust the valve 7 off of its seat, the valve at this time moving along the stem 4 until its boss 8 comes against the stop pin 11. Thus gas will be free to flow to the burner and the temperature of the water in the heater will be raised. During the increase of temperature the thermostat element 19 will be expanded and the projection 20 will therefore shift away from the thermostat element 19 with the result that the lower end of lever 21 will swing inwardly toward the thermostat and permit lever 24 to move, at its lower end, toward the casing 2 under the action of the tensioned spring 6. As this spring is stronger than the springs 17, it will cause the links 15 to wedge between the stem 4 and links 13 until the inner ends of links 15 are brought past their dead centers, whereupon spring 17 will be released and will cause the links 13 to move toward each other. In view of the fact that the inner ends of the links 15 are anchored in the notches 16, this inward swinging movement of the links 13 will also cause the links to shift longitudinally to the position illustrated by dotted lines in Fig. 2 with the result that valve 7 will be brought to its seat.

From the foregoing it will be apparent that a quick opening or closing of the valve is effected whenever the temperature of the liquid in the thermostat element 19 is brought to predetermined degrees.

Figure 4:
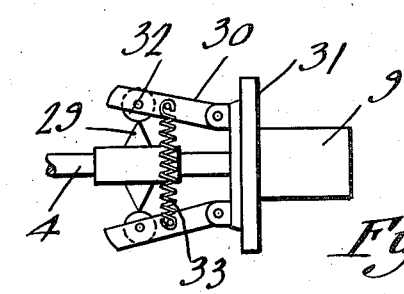
Fig. 4 is a side elevation of a portion of a slightly modified form of valve mechanism.

Instead of providing the toggle links 15 heretofore described, the stem mounted for sliding movement in the valve casing may be provided with oppositely extending knife edges 29 and the links 30 connected to the valve 31 may be provided with rollers 32 designed to work across the knife edges, these links 30 being connected by coiled springs 33 as in the structure heretofore described. This modified form of device has been illustrated in Fig. 4 and it will be obvious that the action thereof will be the same as that heretofore described, the springs 33 holding the rollers 32 at either side of the knife edges so as to cause the springs 33 to quickly shift the valve to either open or closed position, according to the direction of movement of the stem on which the valve is mounted.

By means of the screw 26, the thermostat may be adjusted so as to become effective at any desired temperature. The spring strip 27 extending from the lever 24 acts as a means for preventing injury to the thermostat or to any of the parts of the valve mechanism, if the movement of lever 24 should be excessive and should continue after the stem 4 has reached either limit of its movement.

What is claimed is:

1. The combination with a valve casing having a seat, and a stem mounted to slide within the casing, of a valve slidably engaged by the stem, opposed resiliently connected links carried by the valve, and means interposed between the links and stem for directing the valve onto or away from its seat under the action of said connection when the stem is brought to either of two predetermined positions respectively.

2. The combination with a valve seat and a valve, of a stem slidable within the valve, opposed links pivotally connected to the valve, a resilient connection between the links, means interposed between the links and stem for drawing the valve onto and pressing it away from the seat under the action of said resilient connection.

3. The combination with a valve seat and a valve, of a stem slidable within the valve, opposed links pivotally connected to the valve, a resilient connection between the links, means interposed between the links and stem for drawing the valve onto and pressing it away from the seat under the action of said resilient connection, and coöperating means upon the valve and stem for limiting the relative movement of said valve and stem.

4. The combination with a valve seat and a valve, of a stem slidably mounted within the valve, opposed links extending from the valve, a spring connection between the links, means interposed between the stem and links for directing the valve onto or away from its seat under the action of the spring when the stem is brought to either of two predetermined positions, and thermostatically controlled means for actuating the stem.

5. The combination with a valve seat and a valve, of a stem slidably mounted within the valve, opposed links extending from the valve, a spring connection between the links, means interposed between the stem and links for directing the valve onto or away from its seat under the action of the spring when the stem is brought to either of two predetermined positions, a spring for holding the stem normally in a predetermined position, and thermostatically controlled means for shifting the stem out of said position.

6. The combination with a valve seat and a valve, of a stem slidably mounted within the valve, opposed links extending from the valve, a spring connection between the links, means interposed between the stem and links for directing the valve onto or away from its seat under the action of the spring when the stem is brought to either of two predetermined positions, a spring for holding the stem normally in a predetermined position, and thermostatically controlled means for shifting the stem out of said position, said means including a resilient member.

In testimony that I claim the foregoing as my own, I have hereto affixed my signature in the presence of two witnesses.

ADOLF BELER.

Witnesses:
 R. A. TROOP,
 FRED B. FISHER.